United States Patent
Liljenberg et al.

(10) Patent No.: US 9,950,737 B2
(45) Date of Patent: Apr. 24, 2018

(54) HYDRAULIC STEERING SYSTEM

(71) Applicant: Danfoss Power Solutions ApS, Nordborg (DK)

(72) Inventors: Soeren Liljenberg, Soenderborg (DK); Tom Rudolph, Sydals (DK); Tom Tychsen, Grästen (DK); Jens Vester, Soenderborg (DK); Poul Ennemark, Soenderborg (DK)

(73) Assignee: Danfoss Power Solutions ApS, Nordborg (DK)

(*) Notice: Subject to any disclaimer, the term of this patent is extended or adjusted under 35 U.S.C. 154(b) by 99 days.

(21) Appl. No.: 15/092,718

(22) Filed: Apr. 7, 2016

(65) Prior Publication Data

US 2016/0297473 A1    Oct. 13, 2016

(30) Foreign Application Priority Data

Apr. 8, 2015  (EP) .................................. 15162773

(51) Int. Cl.
| | |
|---|---|
| B62D 5/30 | (2006.01) |
| B62D 5/093 | (2006.01) |
| B62D 5/06 | (2006.01) |
| B62D 5/08 | (2006.01) |
| B62D 5/12 | (2006.01) |

(52) U.S. Cl.
CPC .............. B62D 5/30 (2013.01); B62D 5/062 (2013.01); B62D 5/08 (2013.01); B62D 5/093 (2013.01); B62D 5/12 (2013.01)

(58) Field of Classification Search
CPC . B62D 5/30; B62D 5/062; B62D 5/08; B62D 5/093; B62D 5/12
See application file for complete search history.

(56) References Cited

U.S. PATENT DOCUMENTS

| | | | |
|---|---|---|---|
| 4,372,413 A | 2/1983 | Petersen et al. | |
| 4,412,415 A | 11/1983 | Thomsen et al. | |
| 4,828,283 A * | 5/1989 | Ishii | B60G 17/0523 180/415 |
| 4,972,916 A | 11/1990 | Miller | |
| 7,837,001 B2 * | 11/2010 | Young | B62D 5/093 180/441 |

FOREIGN PATENT DOCUMENTS

EP   2 186 710 A1   5/2010

\* cited by examiner

*Primary Examiner* — Tony H Winner
*Assistant Examiner* — Marlon A Arce
(74) *Attorney, Agent, or Firm* — McCormick, Paulding & Huber LLP

(57) ABSTRACT

A hydraulic steering system (1) is described comprising a first steering circuit (2a) and a second steering circuit (2b), each of said steering circuits (2a, 2b) comprising a steering device (3a, 3b) and a steering motor (4a, 4b) connected to said steering device (3a, 3b), each of said steering devices (3a, 3b) comprising a supply port arrangement having a high pressure port (Pa, Pb) and a low pressure port (Ta, Tb), a working port arrangement having two working ports (La, Ra; Lb, Rb) connected to said steering motor (4a, 4b), a control valve (5a, 5b), and a measuring motor (6a, 6b). Such a steering system should have a comfortable steering behavior. To this end in each of said steering devices (3a, 3b) said measuring motor (6a, 6b) is arranged in a working line (19a, 20b) between said control valve (5a, 5b) and one of said working ports (La, Ra; Lb, Rb).

19 Claims, 1 Drawing Sheet

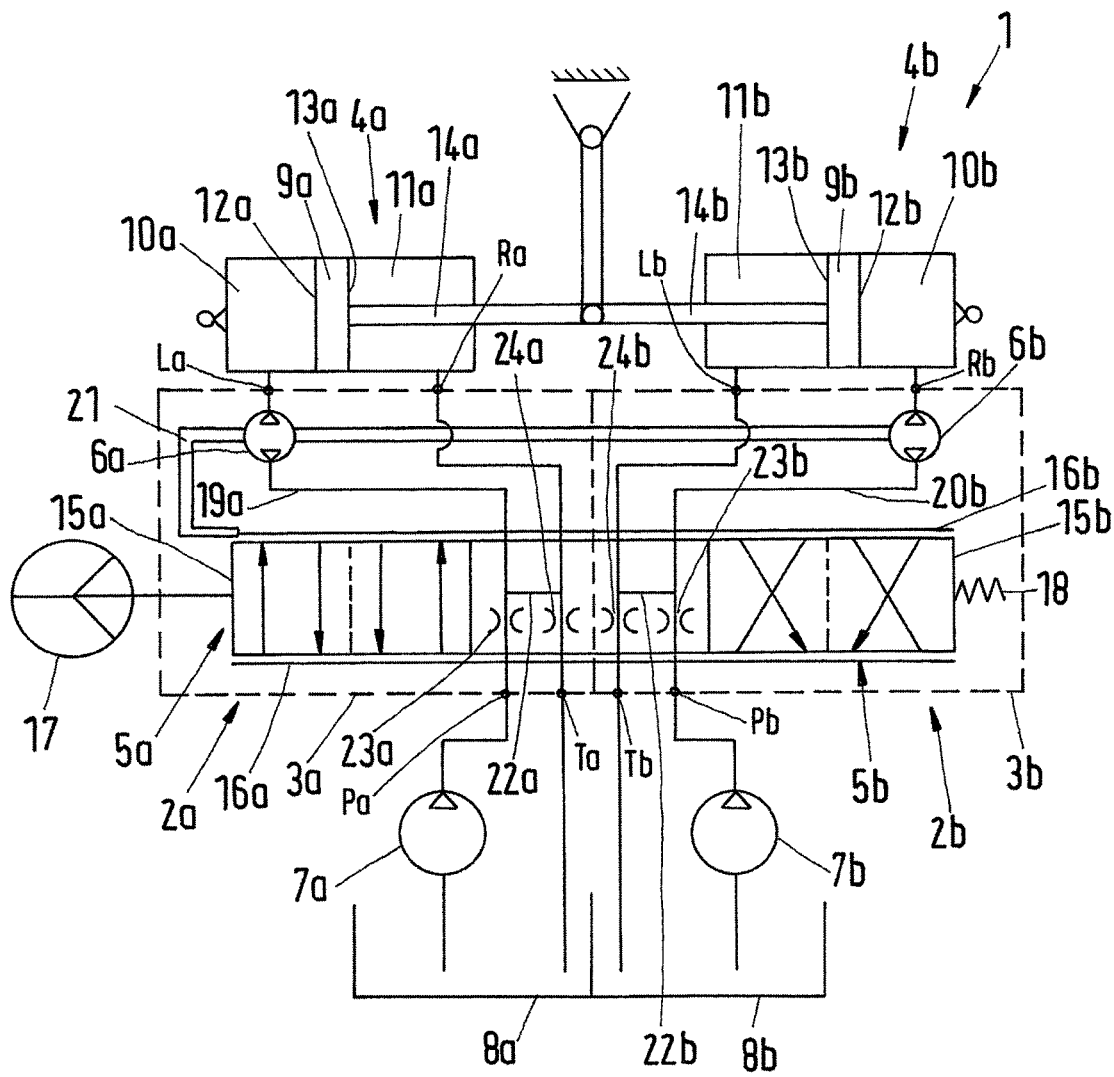

HYDRAULIC STEERING SYSTEM

CROSS REFERENCE TO RELATED APPLICATION

Applicant hereby claims foreign priority benefits under U.S.C. § 119 from European Patent Application No. EP15162773 filed on Apr. 8, 2015, the content of which is incorporated by reference herein.

TECHNICAL FIELD

The present invention relates to a hydraulic steering system comprising a first steering circuit and a second steering circuit, each of said steering circuits comprising a steering device and a steering motor connected to said steering device, each of said steering devices comprising a supply port arrangement having a high pressure port and a low pressure port, a working port arrangement having two working ports connected to said steering motor, a control valve, and a measuring motor.

BACKGROUND

Such a steering system is known, for example, from EP 2 186 710 A1.

The use of two steering circuits has the advantage of a greater reliability. The risk of a dangerous situation during the operation of a vehicle equipped with such a steering system is reduced. When a vehicle equipped with such a steering system is driven, the driver actuates a steering member, for example, a steering wheel, which is connected to the control valves. Depending on the direction of the steering movement the control valves open flow paths from the respective high pressure ports to one of the working ports and another flow path from the other working port of each steering circuit to the respective low pressure port. In each flow path a number of throttling means in form of orifices or bleeds are arranged. Before entering the respective control valve the fluid from the high pressure port is guided through the measuring motor. The measuring motor acts on the control valve in a sense to close the above mentioned flow paths when an amount of hydraulic fluid corresponding to the intended steering angle of the steering member has been delivered or metered to the respective working port.

In the steering system of the prior art the control valves each comprise a housing having a bore in which a spool and a sleeve are positioned. The spool and the sleeve can be rotated relative to each other to open the above mentioned flow paths and to close other flow paths, if appropriate.

Such a steering system has the drawback that a change from one steering direction to the opposite steering direction shows a certain gap or a dead zone. In other words, when the steering direction is changed a certain time passes before the steering motors can react to the new steering command. This makes in some cases steering difficult and uncomfortable.

SUMMARY

The object underlying the invention is to show a hydraulic steering system having a comfortable steering behavior.

This object is solved with a hydraulic steering system as described at the outset in that in each of said steering devices said measuring motor is arranged in a working line between said control valve and one of said working ports.

The function of the measuring motor is the same as before. It meters the amount of hydraulic fluid passing through the working port and resets the control valves, i.e. closes respective fluid paths and opens other fluid paths, if appropriate, when the required amount of hydraulic fluid has passed through the respective working ports. However, when the steering direction is changed, there is no dead band or time gap between steering in one direction and steering in the opposite direction. This makes steering more comfortable.

In a preferred embodiment each of said steering motors is a hydraulic cylinder having a first pressure chamber and a second pressure chamber, said pressure chambers being separated by a piston, wherein said piston has a first pressure area in said first pressure chamber and a second pressure area in said second pressure chamber and said first pressure area and said second pressure area are of different sizes. Such a hydraulic cylinder is, in other words, unsymmetrical. The amount of fluid necessary to move the piston in one direction is different from the amount of fluid moving the piston in the other direction. However, the pressure required for moving the piston in one direction differs as well from the required pressure for moving the piston in the other direction.

Preferably said first pressure area is larger than said second pressure area. The same pressure on the first pressure area generates a larger force than on the second pressure area.

Preferably said piston comprises a single piston rod. This makes the construction of the cylinder simpler. Only one opening is necessary for passing the piston rod to the outside. Only in this opening a sealing means is required.

Preferably said first pressure areas of said pistons are loaded in opposite directions. This is a further advantage of the use of two separate steering circuits. The two pistons can be connected by a common piston rod and can therefore move in synchronism with each other.

Preferably said measuring motors are connected to said first pressure chambers of said steering motors. In this case the available pressure can produce the highest force possible.

In a preferred embodiment each of said control valves comprises a neutral position in which said two working lines are connected. In this way it is possible to use the measuring motors as auxiliary pumps in case that the pressure at the high pressure ports is not high enough for steering, for example due to a failure in the motor of the vehicle driving the main pump supplying the steering system with hydraulic fluid. When the supply pressure at the high pressure ports is not sufficient to actuate the steering motors, the necessary hydraulic pressure can be generated with means of the measuring motors. Since the measuring motors are directly arranged between the two ports of the respective steering motors, a direct steering of the steering systems is possible. The measuring motor is actuated by the steering member, for example by the steering wheel.

Preferably in said neutral position said high pressure port and said low pressure port are connected to each other via throttling means. In this way an open center steering system is realized. The throttling means prevent a too large flow through the steering devices. However, the steering devices can be kept on a temperature corresponding to the temperature of the hydraulic fluid.

Preferably said throttling means comprise a first bleed between said high pressure port and a connection of said two working lines. In this way the hydraulic fluid supplied to the high pressure ports of the steering devices is throttled before it can reach the connection between the two working ports of the respective steering device. The two working ports are prevented from being permanently loaded by the pressure of the high pressure ports.

Furthermore, it is preferred that said throttling means comprise a second bleed between said low pressure port and said connection of said two working ports. The first bleed and the second bleed form a pressure divider with which an ideal pressure at the working ports can be adjusted.

Preferably said control valves comprise a common control valve element arrangement. The two control valves can, in other words, be unified. This simplifies the common control of the two control valves.

BRIEF DESCRIPTION OF THE DRAWING

A preferred embodiment of the invention will now be described in more detail with reference to the drawing, wherein:

the only FIGURE shows schematically a hydraulic steering system.

DETAILED DESCRIPTION

A hydraulic steering system 1 comprises a first steering circuit 2a and a second steering circuit 2b. The first steering circuit 2a comprises a first steering device 3a and a first steering motor 4a which is connected to the first steering device 3a. First steering device 3a comprises a supply port arrangement having a high pressure port Pa and low pressure port Ta, a working port arrangement having a first working port La and a second working port Ra, wherein the two working ports La, Ra are connected to the steering motor 4a. The first steering device 3a furthermore comprises a control valve 5a and a measuring motor 6a. Finally the first steering circuit 2a comprises a supply pump 7a connected to the high pressure port Pa, and a tank 8a connected to the low pressure port Ta.

In similar manner the second steering circuit 2b comprises a second steering device 3b and a second steering motor 4b. The second steering device 3b comprises a second control valve 5b and a second measuring motor 6b. The second steering circuit 2b is provided with a second pump 7b and a second tank 8b. It should be mentioned, that the two tanks 8a, 8b can be unified to form a single tank.

The second steering device 3b comprises a supply port arrangement having a high pressure port Pb and a low pressure port Tb. Furthermore, the second steering device 3b comprises a working port arrangement having a first working port Lb and a second working port Rb. The two working ports Lb, Rb are connected to the second steering motor 4b. The high pressure port Pb is connected to the second pump 7b and the low pressure port Tb is connected to the tank 8b.

The first steering motor 4a is a hydraulic cylinder having a piston 9a separating a first pressure chamber 10a and a second pressure chamber 11a from each other. The piston 9a has a first pressure area 12a in said first pressure chamber 10a and a second pressure area 13a in said second pressure chamber 11a. The second pressure chamber 13a is smaller than the first pressure area 12a, because the piston 9a is provided with a single piston rod 14a which is arranged only on one side of the piston 9a so that the size of the first pressure area 12a and the size of the second pressure area 13a differ by the size of the section of the piston rod 14a.

The second steering motor 4b is identical to the first steering motor 4a, but arranged to be operated in the opposite direction. It comprises a piston 9b separating a first pressure chamber 10b and a second pressure chamber 11b from each other. The piston 9b is provided with a first pressure area 12b in the first pressure chamber 10b and with a second pressure area 13b in the second pressure chamber 11b. The first pressure area 12b is by the size of a piston rod 14b connected to the piston 9b larger than the size of the second pressure area 13b.

The first control valve 5a comprises a first spool 15a and a first sleeve 16a. The second control valve 5b comprises a second spool 15b and a second sleeve 16b. In the present embodiment the first spool 15a and the second spool 15b are unified and form a common element. This is in the following referred to as "spool 15". In the same way the first sleeve 16a and the second sleeve 16b are unified to form a common sleeve 16.

The spool 15 can be rotated relative to the sleeve 16 by means of a steering wheel 17 or any other steering element. A spring 18 is provided for rotating spool 15 relative to sleeve 16 into a neutral position shown in the FIGURE.

In the first steering device 3a the measuring motor 6a is arranged in a working line 19a connecting the first control valve 5a to the first pressure chamber 10a of the first motor 4a.

In the second steering device 3b the measuring motor 6b is located in a working line 20b connecting the second control valve 5b to the first pressure chamber 10b of the second motor 4b.

The measuring motors 6a, 6b are connected to sleeve 16 by means of a connection 21. Hydraulic fluid passing through the measuring motors 6a, 6b drives the measuring motors 6a, 6b. The rotation of an element of the respective measuring motors 6a, 6b is used to rotate sleeve 16 so that sleeve 16 follows the rotation of spool 15 after a predetermined amount of hydraulic fluid corresponding to a desired steering angle has been passed to the two steering motors 4a, 4b.

In the neutral position shown in the FIG. the control valves 5a, 5b each form a connecting line 22a, 22b, each connecting line 22a, 22b connecting the working ports La, Ra or Lb, Rb, respectively, of the two steering devices 3a, 3b.

The first pressure port Pa is connected to the connecting line 22a by means of a first bleed 23a. The connecting line 22a is connected to the first low pressure port Ta by means of a second bleed 24a.

In the same way the connecting line 22b is connected with the second high pressure port Pb by means of a first bleed 23b and the low pressure port Tb is connected to the connecting line 22b by means of a second bleed 24b.

In the first steering device 3a the first bleed 23a and the second bleed 24a can be of the same size, i.e. they can have the same throttling resistance. In this case they form a pressure divider so that the connecting line 22a has a pressure corresponding to a half of the pressure difference between the first high pressure port Pa and the first low pressure port Ta. In the same way in the second steering device 3b the first bleed 23b and the second bleed 24b can have the same size so that the second connecting line 22b the pressure is half of the pressure difference between the second high pressure port Pb and the second low pressure port Tb.

In a first steering position the first control valve 5a connects the first high pressure port Pa and the first pressure chamber 10a of the first steering motor 4a. Furthermore, the first control valve 5a connects the second pressure chamber 11a of the first motor 4a and the first low pressure port Ta.

At the same time the second control valve 5b connects the second high pressure port Pb and the first pressure chamber 10b of the second steering motor 4b as well as the second pressure chamber 11b of the second steering motor 4b to the second low pressure port Tb.

In a second steering position the two high pressure ports Pa, Pb are connected to the second pressure chambers 11a, 11b of the steering motors 4a, 4b and the first pressure chambers 10a, 10b of the steering motors 4a, 4b are connected to the respective low pressure ports Ta, Tb.

Since the measuring motors 6a, 6b are located in the working lines 19a, 20b there is no delay in actuating the measuring motors 6a, 6b when changing the steering direction. This makes steering comfortable.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering system comprising a first steering circuit and a second steering circuit, each of said steering circuits comprising a steering device and a steering motor connected to said steering device, each of said steering devices comprising a supply port arrangement having a high pressure port (Pa, Pb) and a low pressure port (Ta, Tb), a working port arrangement having two working ports (La, Ra; Lb, Rb) connected to said steering motor, a control valve, and a measuring motor, wherein in each of said steering devices said measuring motor is arranged in a working line between said control valve and one of said working ports (La, Ra; Lb, Rb), wherein said control valves comprise a common control valve element arrangement, the measuring motors being connected to a common sleeve of the common control valve arrangement by means of a connection.

2. The hydraulic steering system according to claim 1, wherein each of said steering motors is a hydraulic cylinder having a first pressure chamber and a second pressure chamber, said pressure chambers being separated by a piston, wherein said piston has a first pressure area in said first pressure chamber and a second pressure area in said second pressure chamber and said first pressure area and said second pressure area are of different sizes.

3. The hydraulic steering system according to claim 2, wherein said first pressure area is larger than said second pressure area.

4. The hydraulic steering system according to claim 2, wherein said piston comprises a single piston rod.

5. The hydraulic steering system according to claim 2, wherein said first pressure areas of said pistons are loaded in opposite directions.

6. The hydraulic steering system according to claim 2, wherein said measuring motors are connected to said first pressure chambers of said steering motors.

7. The hydraulic steering system according to claim 1, wherein each of said control valves comprises a neutral position in which said two working ports (La, Ra; Lb, Rb) are connected.

8. The hydraulic steering system according to claim 7, wherein in said neutral position said high pressure port (Pa, Pb) and said low pressure port (Ta, Tb) are connected to each other via throttling means.

9. The hydraulic steering system according to claim 8, wherein said throttling means comprise a first bleed between said high pressure port (Pa, Pb) and a connection of said two working ports (La, Ra; Lb, Rb).

10. The hydraulic steering system according to claim 8, wherein said throttling means comprise a second bleed between said low pressure port (Ta, Tb) and said connection of said two working ports (La, Ra; Lb, Rb).

11. The hydraulic steering system according to claim 3, wherein said piston comprises a single piston rod.

12. The hydraulic steering system according to claim 3, wherein said first pressure areas of said pistons are loaded in opposite directions.

13. The hydraulic steering system according to claim 4, wherein said first pressure areas of said pistons are loaded in opposite directions.

14. The hydraulic steering system according to claim 3, wherein said measuring motors are connected to said first pressure chambers of said steering motors.

15. The hydraulic steering system according to claim 4, wherein said measuring motors are connected to said first pressure chambers of said steering motors.

16. The hydraulic steering system according to claim 5, wherein said measuring motors are connected to said first pressure chambers of said steering motors.

17. The hydraulic steering system according to claim 2, wherein each of said control valves comprises a neutral position in which said two working ports (La, Ra; Lb, Rb) are connected.

18. The hydraulic steering system according to claim 3, wherein each of said control valves comprises a neutral position in which said two working ports (La, Ra; Lb, Rb) are connected.

19. The hydraulic steering system according to claim 4, wherein each of said control valves comprises a neutral position in which said two working ports (La, Ra; Lb, Rb) are connected.

* * * * *